Feb. 25, 1958 H. E. REICHERT ET AL 2,824,901
BUS DUCT CONSTRUCTIONS
Filed Feb. 2, 1953

WITNESSES:
Robert C. Baird
Wm. B. Sellers

INVENTORS
Howard E. Reichert
and Samuel S. Fouse.
BY
ATTORNEY

United States Patent Office 2,824,901
Patented Feb. 25, 1958

2,824,901
BUS DUCT CONSTRUCTIONS

Howard E. Reichert, Beaver, and Samuel S. Fouse, Aliquippa, Pa., assignors to Westinghouse Electric Corporation, East Pittsburgh, Pa., a corporation of Pennsylvania Application February 2, 1953, Serial No. 334,644

4 Claims. (Cl. 174—72)

Our invention relates, generally, to bus duct for electrical distribution systems and, more particularly, to T connections for three-phase or three-phase four-wire bus duct.

An object of our invention, generally stated, is to simplify and improve the manner of making T connections for the phase bus bars in bus duct.

A more specific object of our invention is to provide T connections for bus duct having a plurality of phase bus bars enclosed in a housing.

Another object of our invention is to reduce the number of parts required for making T connections in bus duct.

A further object of our invention is to provide for standardizing the parts required for making T connections in bus duct.

Still another object of our invention is to reduce the area required for making T connections to a plurality of bus bars in a bus duct housing.

Other objects of our invention will be explained fully hereinafter or will be apparent to those skilled in the art.

In accordance with one embodiment of our invention, a T connection for a phase conductor is made by utilizing a bus bar having a right angle bend therein, a bus bar having a straight portion, and a flat tire bar which is notched on one edge to span the other phases. The edge of the tie bar having the notch therein is brazed to one edge of the bar which is bent and to the corresponding edge of the straight bar to continue the phase conductor. The tie bars are of suitable lengths for spanning different numbers of the T connections which are in the same plane as the phase bars. The T connection for one phase bar is made by brazing the end of a straight bar to the side of the phase bar, thereby making it unnecessary to supply a tie bar for this connection.

For a better understanding of the nature and objects of the invention, reference may be had to the following detailed description, taken in conjunction with the accompanying drawing, in which.

Figure 1:
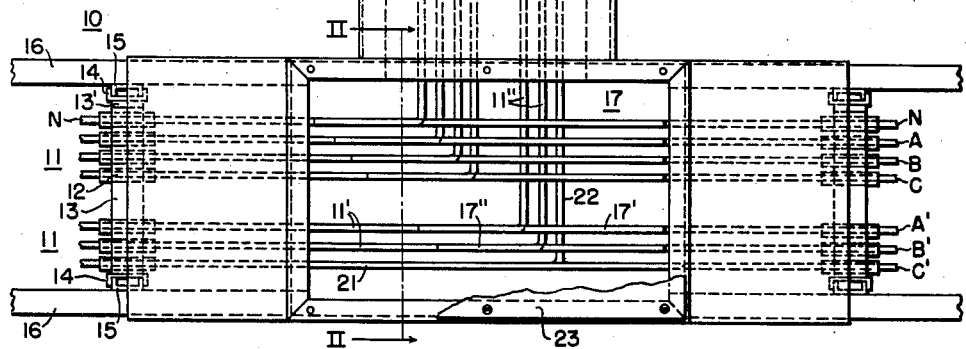
Figure 1 is a view, in side elevation, of a portion of a bus duct embodying the principal features of the invention, portions being broken away for clearness.

Referring to the drawing, and particularly to Fig. 1, the bus duct structure shown therein comprises a housing 10 inside of which are disposed two sets of three-phase bus bars 11 which are supported by insulating blocks 12, 13 and 13'. The corresponding phases of the two sets of bus bars are designated A, B, C and A', B', C'. A neutral bar N may be disposed above the one set of phase bars, or, if desired, it may be disposed between the two sets of phase bars. It will be understood that the conductors for each phase may be connected in parallel-circuit relation. The bus bars on each set are spaced relatively closely together in order to reduce the impedance of the system.

The supporting blocks 12, 13 and 13' are assembled on the bus bars in contiguous relation and maintained under compression by tie bolts (not shown) which extend through the supporting blocks from a channel 14 at the top of a similar channel 14 at the bottom of the blocks. Angle bars 15 may be welded to top and bottom channels 16 of the housing to cooperate with the channels 14 in preventing longitudinal movement of the bus bars.

When installing bus duct it is frequently necessary to provide T connections in the structure. Heretofore, the T connections provided by bus duct manufacturers have been somewhat complicated in structure and required a relatively large amount of space.

Figure 3:
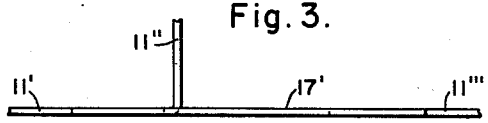
Fig. 3 is a view, in elevation, of a T connection for one phase bar.
Figure 4:
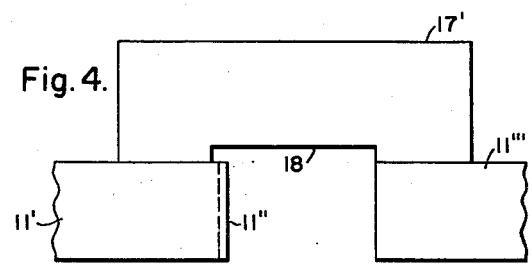
Fig. 4 is a view, in plan, of the T connection shown in Fig. 3.

In order to simplify the structure we devised the T connections herein described. As shown most clearly in Figs. 3, 4 and 5, a T connection for a phase conductor comprises a bar 11' having an angularly bent portion 11" and an additional bar having a straight portion 11'" which is connected to the bus bar 11' by a flat tie bar 17'. The tie bar 17' is notched at 18 on one edge. This edge may be brazed to the corresponding edges of the bars 11' and 11'".

Figure 5:
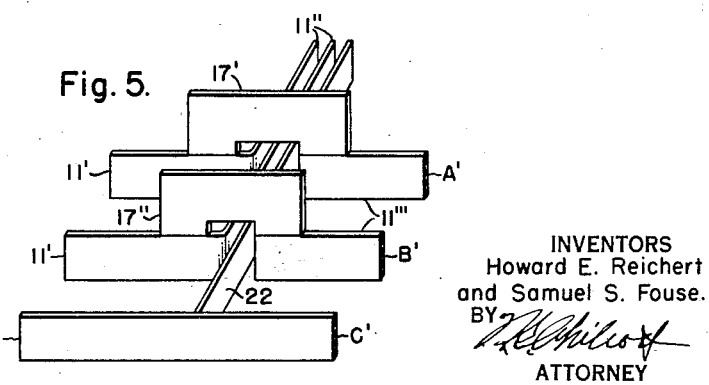
Fig. 5 is an isometric view of the T connections for three of the phase bars shown in Fig. 1.

As shown in Fig. 5, in which the T connections for one set of phase conductors A', B' and C' are illustrated, the T connection for phase C' comprises a bar 21 having one end of another bar 22 brazed to its side to form a right angle connection. The tie bar 17' for phase A' spans the angularly extending portions 11" and 22 for phases B' and C', respectively. Likewise, the tie bar 17" for phase B' spans the portion 22 for phase C'. In a similar manner, tie bars 17 for phases A, B and C and the neutral N span the angularly extending portions of the T connections, the different tie bars being of suitable lengths to reach across the angularly extending portions as shown in Fig. 1. The notch 18 in each tie bar provides clearance between the tie bar and the angularly extending portions.

In this manner the T connections are in the same plane as the phase bars. The connections are made by utilizing bars having simple right angle bends therein and flat tie bars having a notch in one edge or bars formed into a U shape. A relatively small amount of brazing is required to make the connections. Also, the connecting area is relatively small, which permits ventilating the T legs. Another advantage of the invention is that the dimensions of the T taken in the plane of Fig. 1 are no greater than the normal width of the duct.

Figure 2:
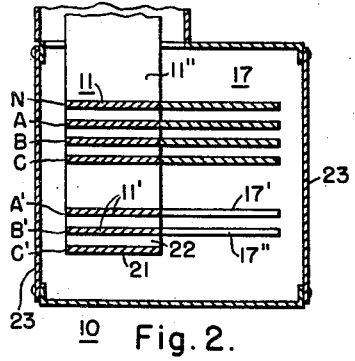
Fig. 2 is a view, in section, taken along the line II—II in Fig. 1.

As shown in Fig. 2, the enlarged or deeper portion of the housing 10 extends only across the top of the T and is provided with removable cover plates 23 to permit access to the T connections. Thus, the necessary brazing operations may be readily performed when making the T connections.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a T for a three-phase bus duct having a plurality of juxtaposed bus bars, a substantially flat phase bar bent sidewise to form an angularly extending portion and an additional substantially flat bar for each one of two phases, a third substantially flat bar having another bar secured thereto perpendicularly for the third phase, and a substantially flat tie bar for each one of the first two phases, each tie bar having an edge portion joined to an edge portion of the phase bar and another edge portion joined to an edge portion of the additional bar for its corresponding phase and spanning the angularly extending portions of the bars for other phases.

2. In a multi-phase bus duct, in combination, a housing, at least two substantially flat bus bars for each phase disposed in the housing, all of said bus bars except one being bent sidewise to form angularly extending portions, another substantially flat bar corresponding to and spaced from each one of said bent bars, an additional bus bar having an angularly extending portion secured thereto and disposed parallel to the angularly extending portions of the bent bars, a substantially flat tie bar spanning the space between each bent bar and its corresponding bar in which is disposed an angularly extending portion of at least one other bar, and each tie bar having edge portions joined to edge portions of the flat bars.

3. A T connection for one phase of a multiphase bus duct having a plurality of substantially flat bus bars with their longitudinal center lines lying in the same plane comprising a first bar having a straight portion with an integrally formed substantially right angle extension thereon, the longitudinal center line of the extension being in the same plane as the longitudinal center line of the straight portion, a second bar for said phase spaced from the first bar and aligned with the straight portion of the first bar, and a generally U-shaped flat tie bar for said phase, said tie bar having one leg connected to said first bar and the other leg connected to the second bar for its phase and spanning the space between said first bar and said second bar in which is disposed an angularly extending portion of a bar for at least one other phase of the multiphase bus duct.

4. In a multiphase bus duct, in combination, a housing of a generally rectangular cross section, at least one substantially flat bus bar for each phase of the multi-phase duct, said phase bars being disposed in the housing with the plane of each of the bars perpendicular to the greatest cross-sectional dimension of the housing, an angle connection for one of said phase bars comprising a first bar having a straight portion with an angular extension thereon, the longitudinal center line of the extension being in the same plane as the longitudinal center line of the straight portion, a second bar for said phase spaced from the first bar and aligned with the straight portion of the first bar, a substantially flat tie bar for said phase, the plane of the tie bar being the same as the plane of its phase bar, said tie bar being connected edgewise to the first bar and the second bar for its phase and having a notch therein for spanning an angular extension of at least one other phase bar disposed in the space between the first bar and the second bar, and a removable cover plate on said housing providing access to the angle connection.

References Cited in the file of this patent

UNITED STATES PATENTS

| | | |
|---|---|---|
| 439,391 | Edison | Oct. 28, 1890 |
| 502,083 | McEvoy | July 25, 1893 |
| 926,148 | Sullivan | June 29, 1909 |
| 1,840,887 | Mask | Jan. 12, 1932 |
| 2,007,174 | Benjamin | July 9, 1935 |
| 2,297,170 | Rudd | Sept. 29, 1942 |